United States Patent [19]
Kroll et al.

[11] Patent Number: 6,115,597
[45] Date of Patent: Sep. 5, 2000

[54] DISPOSAL EMERGENCY CELLULAR PHONE

[76] Inventors: Braden W. Kroll; Mark W. Kroll, both of 651 Carnellon Ct., Simi Valley, Calif. 93065

[21] Appl. No.: 08/895,358

[22] Filed: Jul. 16, 1997

[51] Int. Cl.[7] .................................................. H04M 15/00
[52] U.S. Cl. ........................................... 455/404; 455/435
[58] Field of Search ..................................... 455/404, 435, 455/518

[56] References Cited

U.S. PATENT DOCUMENTS

| | | |
|---|---|---|
| 5,203,009 | 4/1993 | Bogusz et al. . |
| 5,334,974 | 8/1994 | Simms et al. . |
| 5,365,570 | 11/1994 | Boubelik et al. . |
| 5,388,147 | 2/1995 | Grimes et al. . |
| 5,388,148 | 2/1995 | Seiderman et al. . |
| 5,465,388 | 11/1995 | Zicker et al. . |
| 5,479,482 | 12/1995 | Grimes et al. . |
| 5,563,931 | 10/1996 | Bishop et al. . |
| 5,797,101 | 8/1998 | Osmani et al. ......................... 455/407 |
| 5,870,459 | 2/1999 | Phillips et al. .......................... 455/407 |

OTHER PUBLICATIONS

SOS Phone User Guide SOS Wireless Communications.

*Primary Examiner*—David R. Hudspeth
*Assistant Examiner*—M. David Sofocleous

[57] ABSTRACT

The present invention teaches an economical disposable emergency cellular phone. A further object of the invention is a new technique for having a large number of cellular phones share the same small group of access numbers and serial numbers in order to reduce the monthly charges to zero for the end consumer.

4 Claims, 7 Drawing Sheets

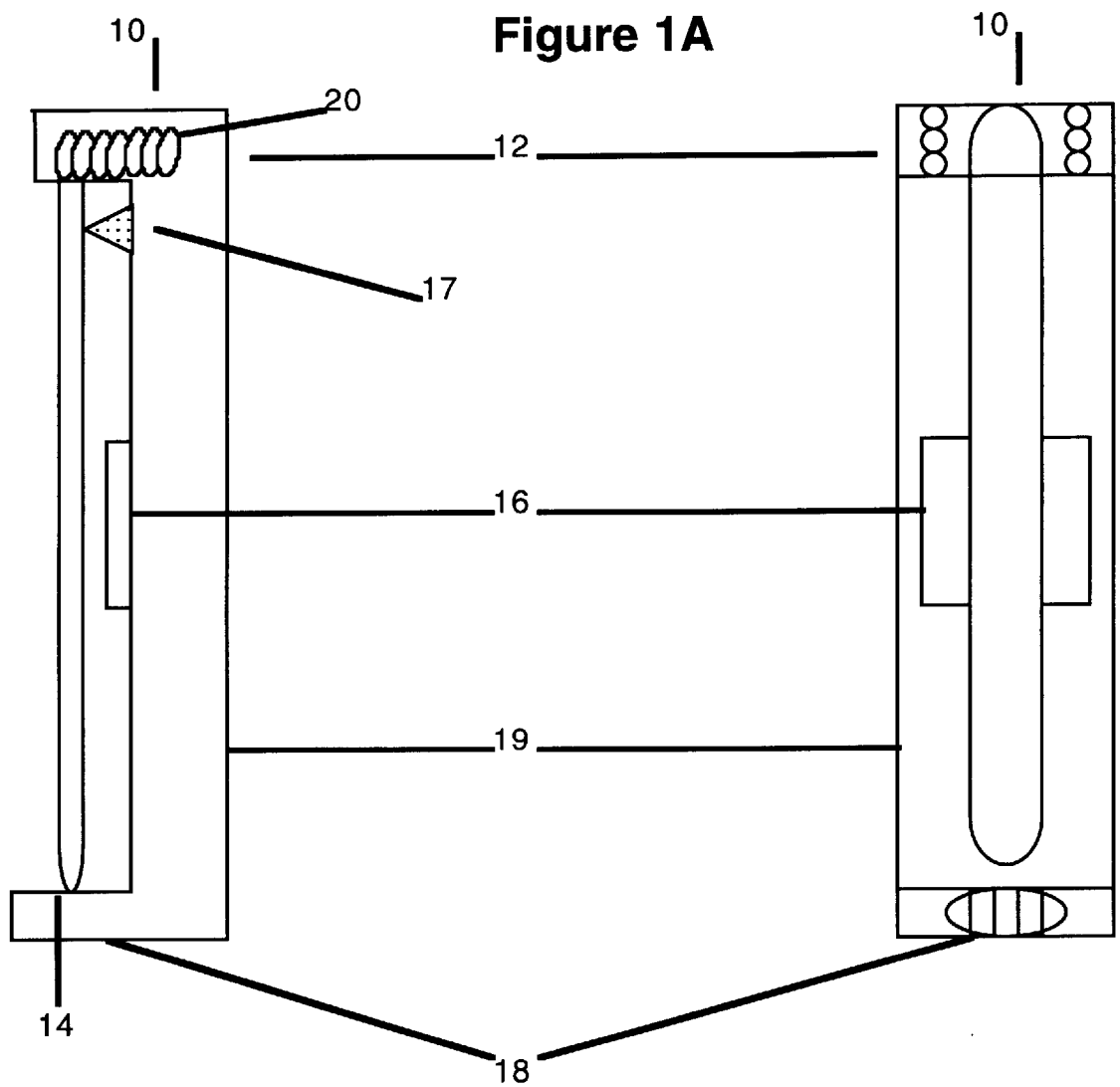

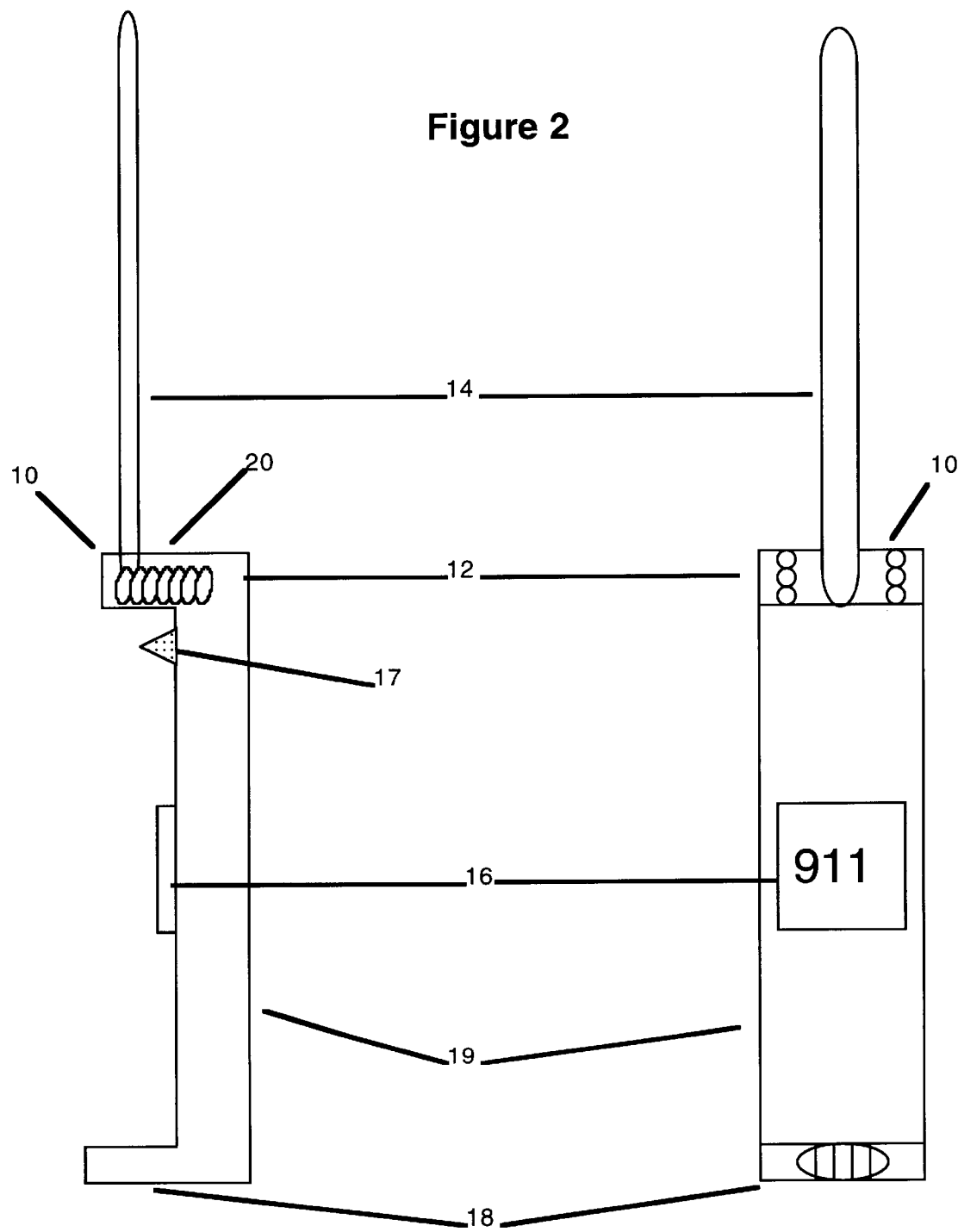

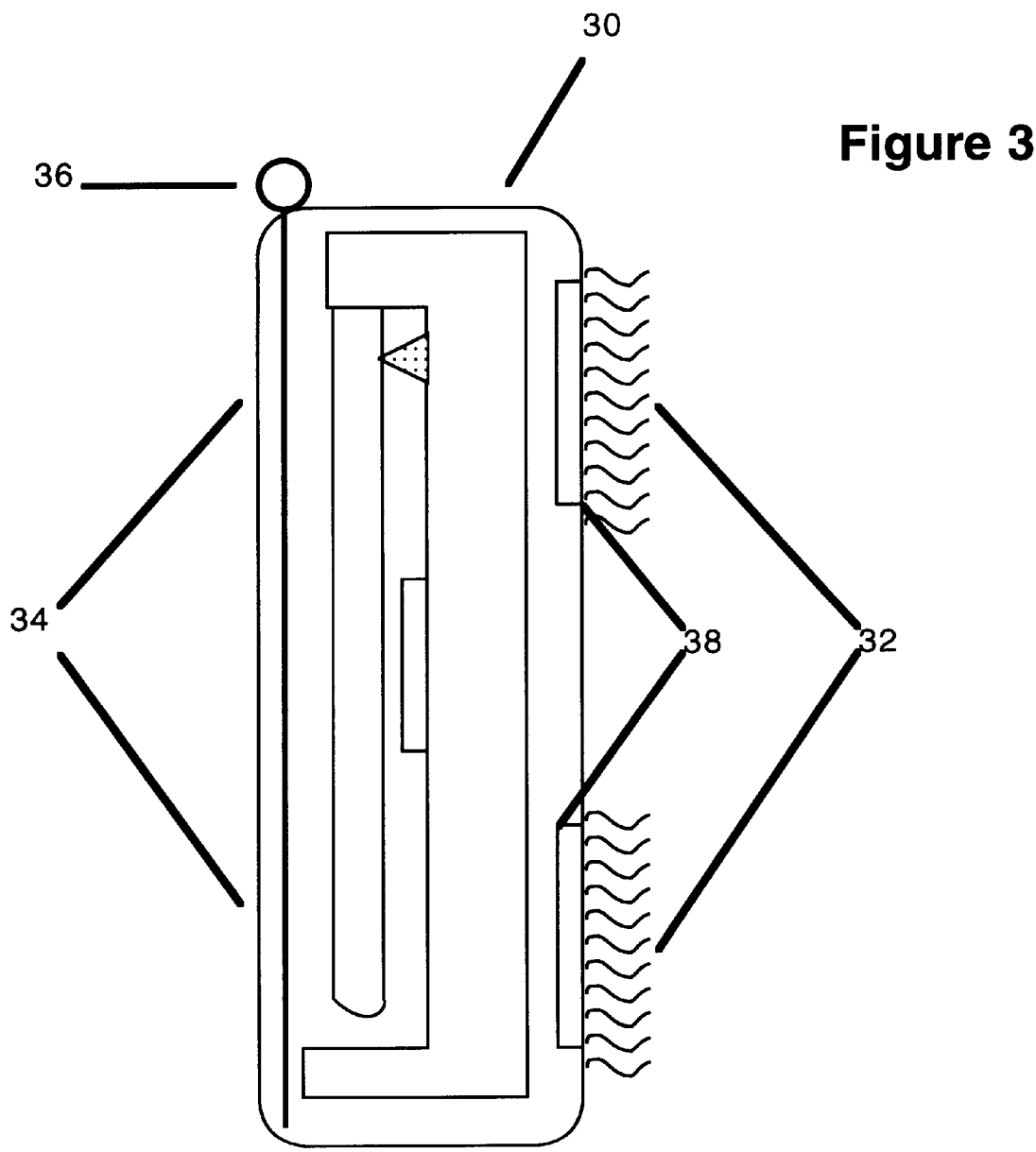

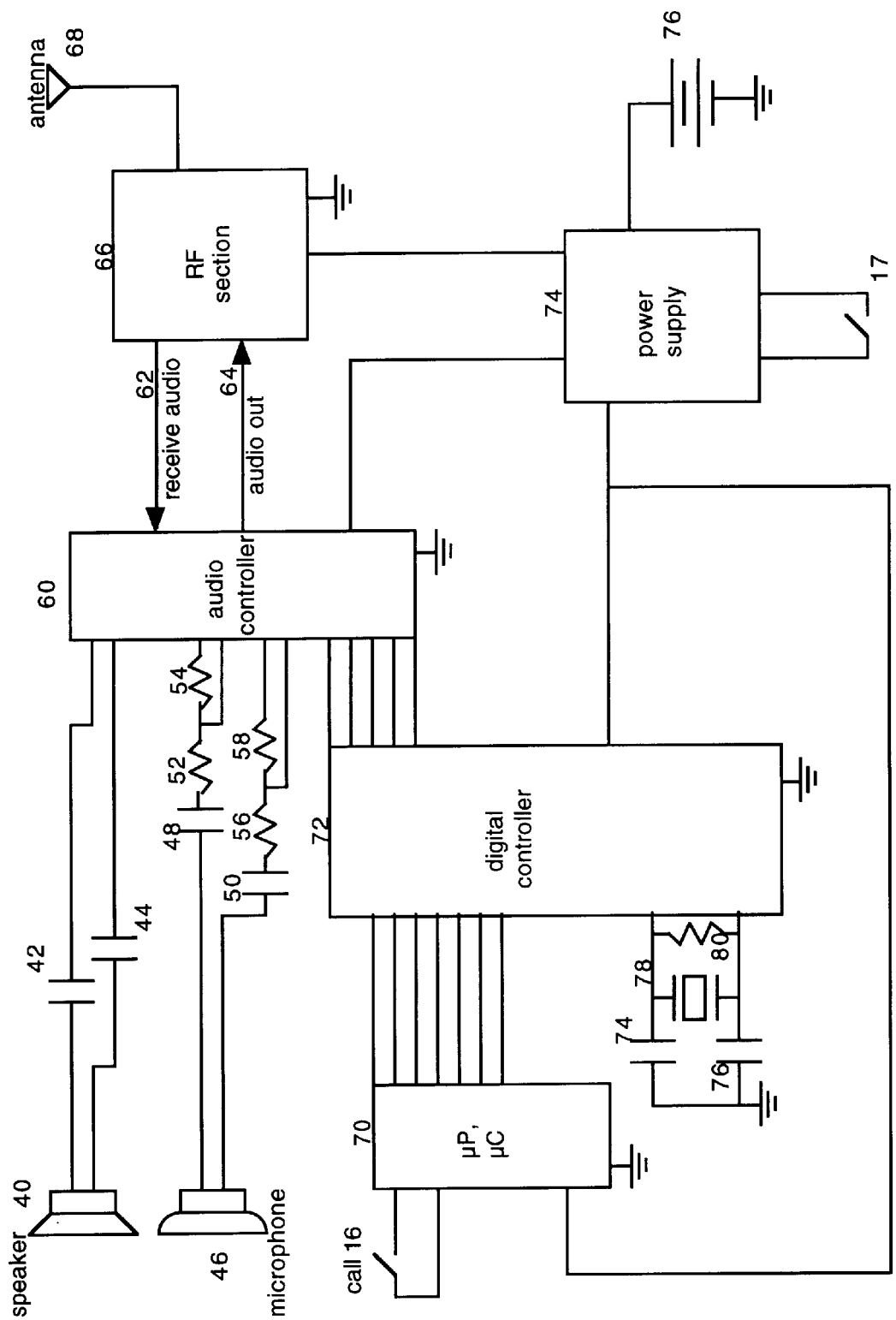

DISPOSAL EMERGENCY CELLULAR PHONE

BACKGROUND OF THE INVENTION

As it is well known cellular phones present a tremendous advantage in dealing with an emergency situation. For this reason a large percentage of automobiles are now equipped with these phones. However, there are several problems with present cellular phone systems. The primary one is that the owner must pay a monthly charge to maintain the use of a number. A secondary one is that the phones present a theft risk. The third problem is that the usage is so convenient that one can very easily run up large bills. Thus, while people tend to buy a cellular phone for emergency use they will often end up spending a significantly larger amount of money on the monthly charges than have been planned.

A number of expensive solutions for emergency cellular phones have been proposed. Grimes (U.S. Pat. Nos. 5,479,482 and 5,388,147) and Moore (U.S. Pat. No. 5,334,974) teach a cellular phone connected to a positioning system such as a GPS or Loran. The other art deals with cellular phones that are restricted to calling 911. These include Zicker (U.S. Pat. No. 5,465,388) and Seiderman (U.S. Pat. No. 5,388,148)—although Seiderman also teaches an integrated credit card reader. Other art covers what might be called "children's" restricted phones. The patent of Boubelik (U.S. Pat. No. 5,365,570) has a mechanical lock over the keyboard to restrict the use to an emergency call button. The art of Bogusz et al (U.S. Pat. No. 5,203,009) and the SOS Phone (product of SOS wireless communications of 3000 Airway Avenue, Costa Mesa, Calif. 92626) restrict the phone to only being able to call two different sites. These could be, for example 911 and home or 911 and a towing company.

The patent of Bishop et al (U.S. Pat. No. 5,563,931) assigned to SOS teaches an emergency phone which requires modifications to the phone company equipment. These modifications would allow the call to bypass the normal cellular call process (col 10 lines 10–13) and to accept specialized numbers including a "pseudo area code" (col 19, lines 14–19). There is no economy in these inventions. For example, the SOS Phone requires the activation of an access service ($99 per year) and thus the phone saves no money per month. In fact, most cellular companies will give away a full function phone for free if one pays the monthly service.

Thus one would have a more economical and broader function phone by simply signing up for the cheapest monthly service and having the discipline to never use the phone except for an emergency. Unfortunately, few people have that level of discipline or control over third parties that might need the phone. Thus there is a need for an economical and durable disposable emergency cellular phone that can be operated without the need to pay a monthly access fee.

BRIEF DESCRIPTION OF DRAWINGS

FIGS. 1a and 1b show a front and side view of the phone with the antenna collapsed.

FIG. 2 shows the side and front views of the phone with the antenna extended.

FIG. 3 shows the phone in its waterproof storage pouch.

FIG. 4 show the basic circuitry for the phone.

SUMMARY OF THE INVENTION AND DETAILED DESCRIPTION

Figure 1B:
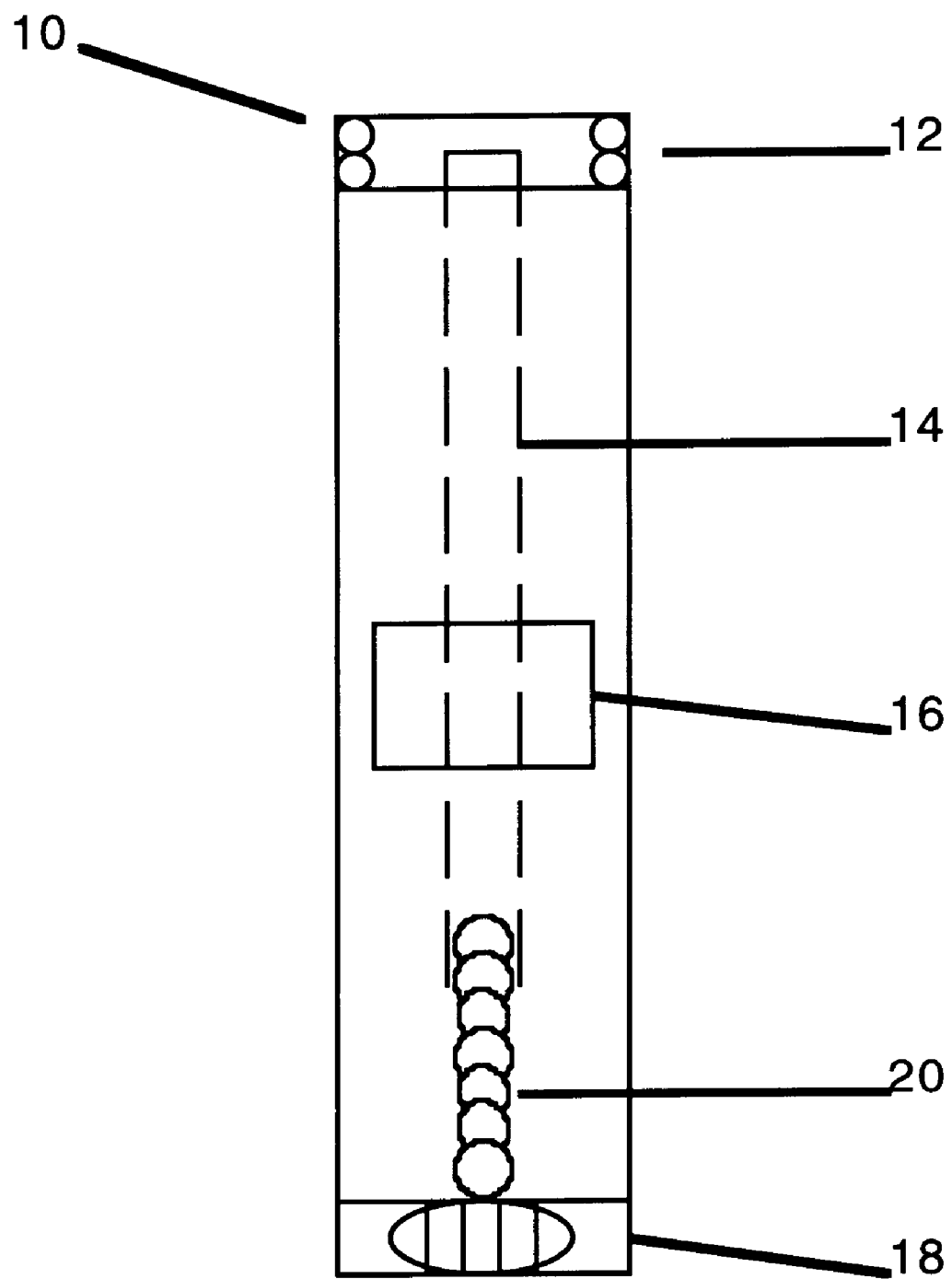

The FIG. 1 depicts the phone with the antenna collapsed from a side and front view. The basic mechanical components of the phone 10 are the speaker and speaker section 12, the antenna 14, and the microphone section 18. The center section 19 carries the batteries and the electronics. It also serves as the base for the "911" button 16.

A spring 20 to automatically deploy the antenna is shown in the speaker section. In an alternative embodiment, the antenna is slid down into the phone body with a linear spring. When the 911 button is pushed, it releases the antenna which then slides out the end into a fully extended position.

In one embodiment, the whole phone is made waterproof through the use of waterproof switches, microphone, and speakers.

FIG. 2 shows the identical components but with the antenna extended. The operation of the spring is such that the antenna is normally fully extended.

FIG. 3 shows the phone of this embodiment in its weatherproof pouch 30. This pouch could be made of any water or weather proof material including vinyl's, polycarbonates or other polymers. Along the front end of pouch 30 is an embedded quick release strip 34 which has a brightly colored large pull tab 36. For use of the phone the tab 36 is gripped and pulled down the complete length of release line 34 to open the pouch and access the phone. This then automatically deploys the antenna due to the operation of the integral spring.

On the back of the phone pouch 30 is an attachment means. In the preferred embodiment this is shown as a Velcro® type of mechanism 32. Alternatively it could be suction cups for glass or adhesives for metal. Further alternatives would include magnets for metal. The Velcro works particularly well for the roof cloth or floor carpeting of many cars. Yet another alternative attachment mechanism would be a combination of Velcro and magnet for universal attachment as shown using the magnets 38 embedded in the pouch.

The pouch is transparent to make the phone contents very obvious in an emergency situation.

Due to the presence of dedicated integrated circuits the electronic portion of a conventional cellular phone design is doable by anyone skilled in the art of electrical engineering. The circuit in FIG. 4 in meant to be broadly illustrative. The circuitry is not meant to be in great detail as that is no longer necessary with this art. Speaker 40 is coupled through capacitors 42 and 44 to audio controller 60. The audio controller 60 receives a demodulated audio line 62 from the RF section chip 66. That RF section chip receives the RF signal from antenna 68. Microswitch 17 is shown connected to the power supply chip for automatically turning on the phone after the antenna is deployed as shown in FIG. 1 and 2.

Microphone 46 is coupled through capacitors 48 and 50 and resistors 52, 54, 56, and 58 into the audio controller 60. The audio controller then sends the "audio out" signal on line 64 into the RF section 66 for final transmission out on antenna 68. When the call button 16 is depressed the microprocessor microcontroller 70 interprets this and activates the appropriate sequences and the digital controller 72 would then give the appropriate controls to the audio controller 60. Digital controller 72 is clocked by a crystal oscillator comprising capacitors 74 and 76, crystal 78, and resistor 80.

All of the electronic components are powered by battery 76 through the power supply chip 74.

A representative audio controller is the TCM 8010 of Texas Instruments, P.O. Box 655303, Dallas, Tex. 75265. A representative RF section IC is the TRF 1015 from Texas Instruments. There are numerous manufacturers of microprocessors or microcontrollers. Sample devices are the 8051 or 8032 available from numerous electronic manufactures. A representative of the digital controller is the TCM 8002 from Texas Instruments. Representative power supply ICs are the TPS9013 or the TPS9104 both of Texas Instruments.

The battery 76 is a permanently installed primary cell such as an alkaline or manganese dioxide cell. The cell must provide high peak currents in transmission but otherwise is not required to have extremely high longevity. By having a permanent primary cell there is an economy over the use of an expensive rechargeable cell and also over the use of a changeable primary cell due to the expense of the battery holders chambers and doors. These battery holders, chambers, and doors for a battery chamber also introduce reliability problems. Microswitch 17 is activated by the antenna springing out and thus automatically turning on the device.

Figure 5:
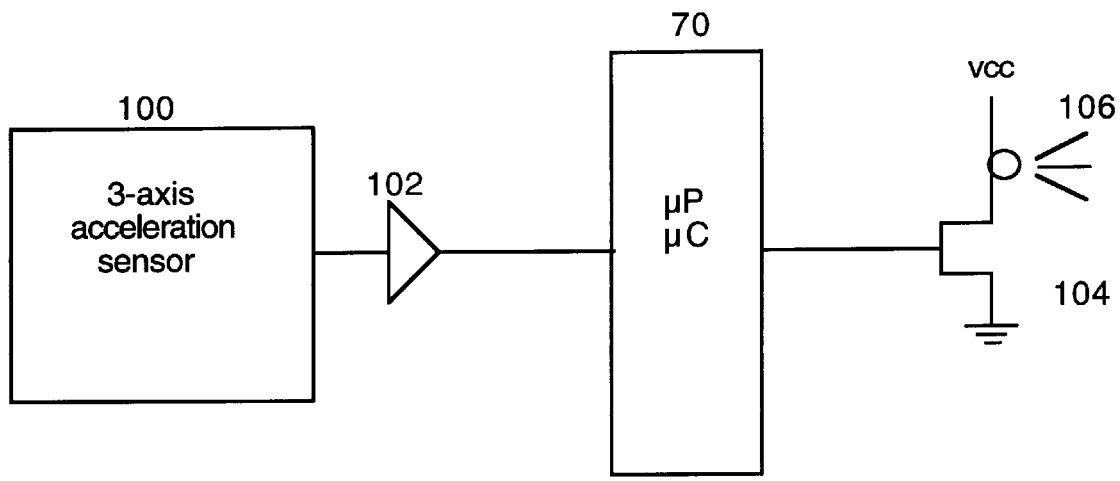
FIG. 5 shows the circuitry modifications for the automatic crash response feature.

FIG. 5 depicts the circuit modifications to allow for the automatic crash activation feature. The three axis acceleration sensor 100 will detect the sudden acceleration from a crash and pass this on to amplifier 102 and then on to the microprocessor and microcontroller 70. If a sufficient force is detected then the device will turn on automatically and begin pulsing through transistor 104 to pulse integral light 106. The light 106 is also used to light up the 911 button after the antenna is deployed. The process microcontroller will also signal the rapid beeping through the phone speaker 40 which is shown in FIG. 4.

If the phone is not operated within 5 minutes of the "crash" then it automatically turns off to save battery life. Alternatively the phone could include a "hang-up" button which could also stop the flashing and pulsing.

Suitable acceleration sensors are available from Analog Devices of Norwich, Mass.

Figure 6:
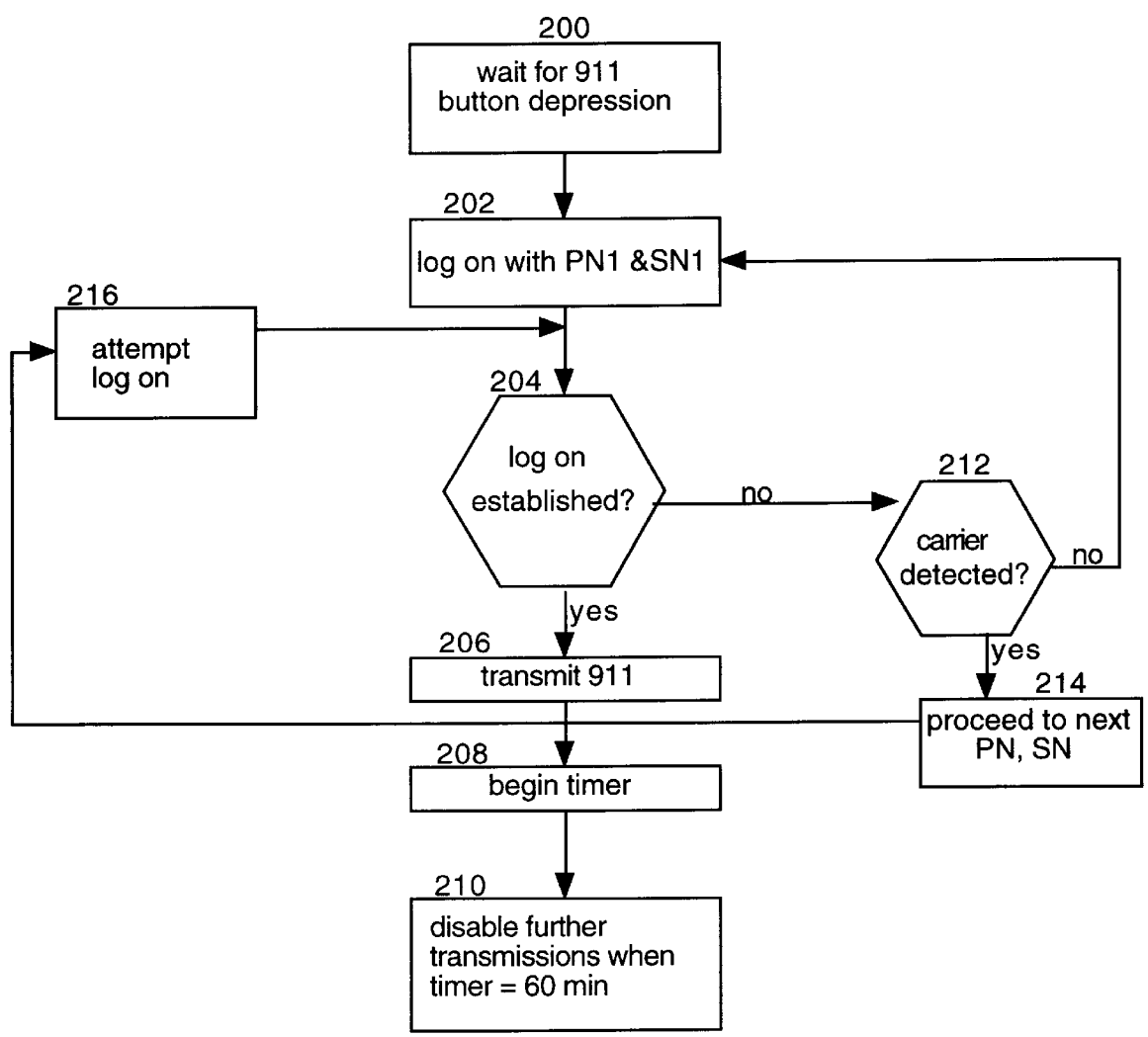
FIG. 6 shows the log-on process to allow the user to bipass a monthly access fee.

FIG. 6 show the flow chart for the operation of the phone with particular attention to the unique feature that allows the operation of the phone without the customer having to pay a monthly access fee for a private number.

The provider (distributor) of the disposable emergency cellular phones will pay a monthly fee for a few phone numbers. Each of these phone numbers (Pn) comes with a serial number (Sn) which will be transmitted with the phone number in order to log on to the cellular system. (A conventional cellular phone also tranmits its phone number and a unique serial number when it logs on. The serial number is kept private and is matched with the phone to minimize fraudulent usage.) One feature of this invention is that thousands of the disposable emergency phones could share a small set of phone numbers (Pn) and matching serial numbers (Sn).

In operation the first step is to wait for the 911 button depression 200. Step 202 is to log on with Pn1 and Sn1. Step 204 is to verify that "log on" is established. If it is established then the method proceeds on to step 206 which is to transmit the 911 number. Then step 208 begins a timer. Finally, at step 210 the device will disable further transmissions when the timer reaches 60 minutes. In an alternative embodiment, a counter is used to limit the number of 911 calls to a small fixed number, say 5. The total talking time would then be limited only by the battery life and the patience of the 911 operators. If at step 204 "log on" was not established then the method proceeds to step 212 which is to verify that a carrier is present. If no carrier is detected then the method returns to step 202 to attempt to log on again. If the carrier is detected then the method proceeds to step 214 and increments to the next phone number and serial number. It then attempts in (step 216) another log-on. The reason for the attempt for different numbers is that it is conceivable that two customers would both be trying to make a 911 call at the exact same time. Were that to occur the first caller would normally lock out that number nationwide and prevent the second caller from getting through. Thus a disposable cellular phone provider would have a few numbers that a minimal monthly service fee is paid for. The system could try the phone and serial numbers in a fixed or random fashion.

Alternatively the phone could simply log on with a public phone number and transmit a 311 or 911 call since many regions of the country require phone companies to accept 311 and 911 calls regardless of the account status.

What is claimed is:

1. A method of operating a system of disposable cell phones through the use of dedicated numbers comprising the steps of the phone registering with the use of a first phone number and serial number and proceeding to use the further numbers if that registration is not successful.

2. The method of claim 1 in which further numbers are selected in a fixed sequence.

3. The method of claim 1 in which further numbers are selected in a random fashion.

4. The method of claim 1 with the further step of checking the total time of usage and refusing transmissions beyond that time.

* * * * *